(12) United States Patent
Brinks et al.

(10) Patent No.: US 6,532,429 B1
(45) Date of Patent: Mar. 11, 2003

(54) OFFSET REGULATION DEVICE

(75) Inventors: Gerald Brinks, Niedersonthofen (DE); Thomas Ohgke, Kircheim (DE); Günther Schuster, Gammelshausen (DE)

(73) Assignee: Temic Telefunken microelectronic GmbH, Nuremberg (DE)

( * ) Notice: Subject to any disclaimer, the term of this patent is extended or adjusted under 35 U.S.C. 154(b) by 0 days.

(21) Appl. No.: 09/403,164

(22) PCT Filed: Feb. 4, 1999

(86) PCT No.: PCT/EP99/00741

§ 371 (c)(1),
(2), (4) Date: Feb. 18, 2000

(87) PCT Pub. No.: WO99/42842

PCT Pub. Date: Aug. 26, 1999

(30) Foreign Application Priority Data

Feb. 18, 1998 (DE) .......................................... 198 06 752

(51) Int. Cl.[7] .............................................. G01P 21/00
(52) U.S. Cl. ...................... 702/104; 73/1.88; 73/514.34
(58) Field of Search ........................ 702/104; 708/100; 369/44.25, 44.34; 73/1.38, 1.88, 514.34

(56) References Cited

FOREIGN PATENT DOCUMENTS

| DE | 3334603 | 4/1985 |
| EP | 0 406 735 | 1/1991 |

*Primary Examiner*—Kamini Shah
(74) *Attorney, Agent, or Firm*—Venable; Norman N. Kunitz

(57) ABSTRACT

The invention relates to an offset regulation device for a sensor module and a method for realizing such an offset regulation, particularly for acceleration sensors and pressure sensors. The disadvantage of currently used offset regulation devices is that impermissible offset drifts or other errors are not recognized and are camouflaged by the offset regulation device. As a result, the measuring values can be distorted. The offset regulation device according to the invention comprises a monitoring device that is integrated into the offset regulation device and which recognizes and indicates such errors. This monitoring device comprises an analog or digital adder, which detects the deviation of the actual value from the desired value or values depending thereon. If the regulation takes too long because the deviation is too large and the offset is therefore not permissible, then a maximum or minimum value is reached during the adding up in the adder. Once a limit value is reached, an error message is generated and indicated.

5 Claims, 1 Drawing Sheet

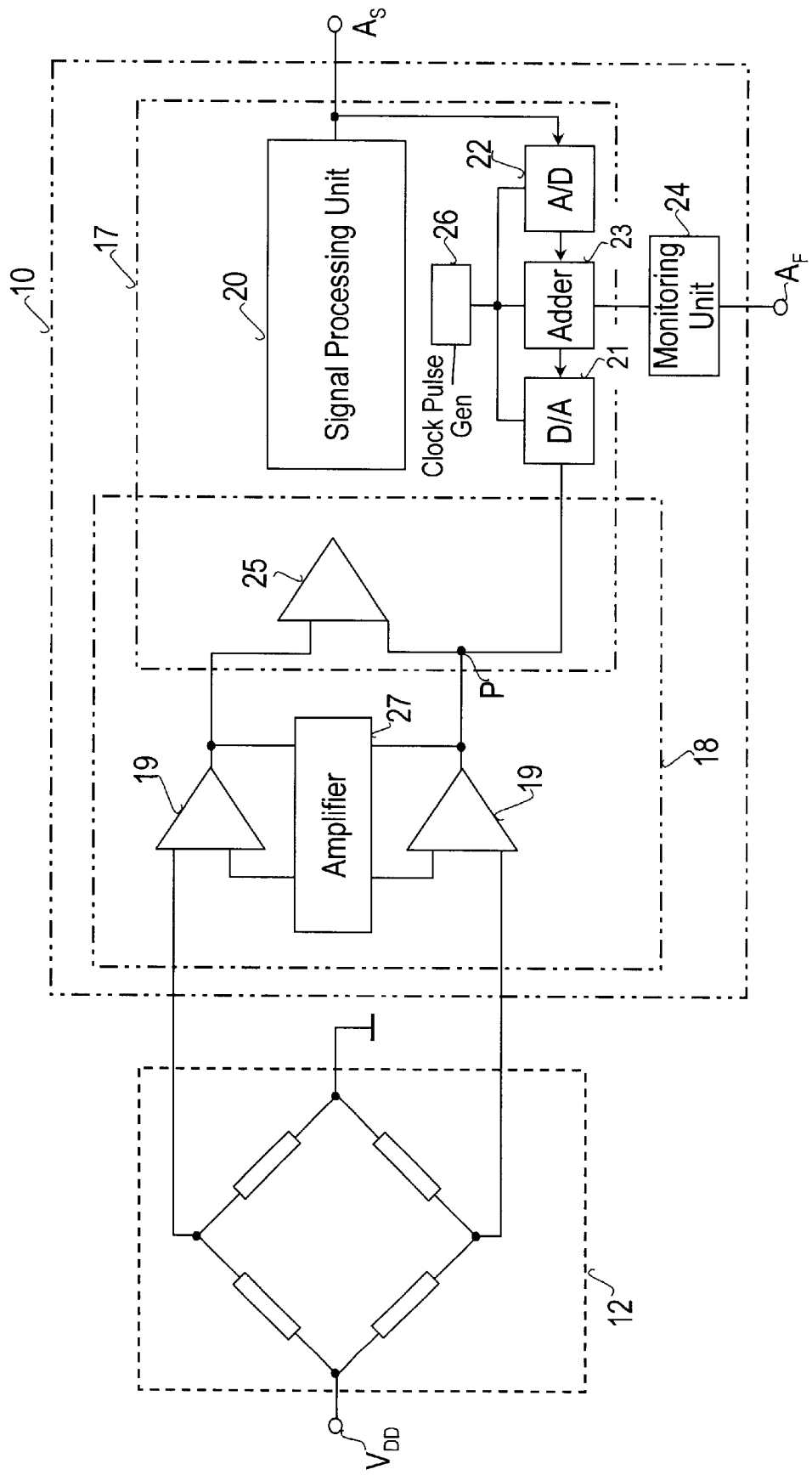

OFFSET REGULATION DEVICE

BACKGROUND OF THE INVENTION

The invention relates to an offset regulation device for a sensor module, in particular for acceleration sensors and pressure sensors, wherein the offset regulation device detects an actual value, compares this value to a desired value and, if there is a deviation, adjusts the actual value to match the desired value.

Various sensor modules with offset regulation are known. With these, zero point changes are measured, which are also referred to as offset drift, and are compensated with the aid of a control circuit. These changes can occur on the most varied components, particularly the actual sensor element that functions to detect a physical variable, as well as the connections between sensor element and signal processing unit. The causes for the offset drifts can be found, for example, in the aging of the components and the connections or they can be caused by temperature changes, which influence the properties of the components and their connections. Such influences can be omitted with the offset regulation in that a zero-point compensation takes place, so that the measuring result is not distorted owing to a displacement of the zero point. Many offset regulation devices are designed as high-pass filters, which filter out time-constant variables such as the zero point displacement of a signal.

However, the disadvantage of the offset regulation device is that impermissible changes in the zero point, caused by defective parts, e.g., parts that wear out too soon or age too fast or display an above-average temperature sensitivity, cannot be detected. The high-pass filter does not recognize whether the time-constant variable exceeds a specific maximum value or minimum value. In the event that the offset representing a zero point displacement exceeds a maximum or minimum permissible value, this is an indicator that a component is no longer operative. Exact measurements are no longer possible with an inoperative component because the behavior of these components changes so drastically that a reproducibility of the measuring result is no longer ensured. The measuring results obtained despite the offset regulation are incorrect. This is the case even if bonding connections age at different rates and short-circuits occur.

SUMMARY OF THE INVENTION

It is the object of the invention to correct these disadvantages with an offset regulation device of the initially mentioned type.

The above object generally is achieved according to the invention by an offset regulation device for a sensor module, in particular for acceleration sensors and pressure sensors, wherein the offset regulation device detects an actual value, compares this value to a desired value and, in case of a deviation, adjusts the actual value to the desired value, and wherein the offset regulation device includes a monitoring unit or device for recognizing an excessively high offset. The monitoring device comprises an analog or digital, clocked adder, wherein the monitoring device adds up the deviation between actual value and desired value, which has been weighted with an optional factor, and generates an error message once a maximum or minimum limit value has been reached.

Additional advantageous modifications follow from the description. For an offset regulation of the type disclosed herein, each fed-in value is weighted in the adder with a fixed constant, thereby resulting in a predetermination of the speed with which the minimum for maximum limit value is reached.

As a result of this, it is prevented that actually occurring errors, which are otherwise camouflaged, for example, by the high-pass effect of the offset regulation device, are recognized. It is an advantage in this case that the offset monitoring occurs during the offset regulation and errors can therefore be recognized directly during the measuring operation.

The invention is to be represented and explained in the following with the aid of an exemplary embodiment and in connection with the single Figure.

BRIEF DESCRIPTION OF THE DRAWINGS

The FIGURE is a block circuit diagram of an offset regulation device according to the present invention.

The single FIGURE shows a sensor device with an offset control unit and its operating principle. The offset monitoring device as component of a control circuit 17 monitors the signal processing unit 20 of the sensor module in the integrated circuit 10 and the sensor element 12 in order to detect impermissible offset drifts or offset values. This offset monitoring unit, which essentially comprises an adder 23, recognizes:

an impermissible offset drift of the piezoresistive sensor element 12 in dependence on the temperature;

an impermissible offset drift of the piezoresistive sensor element 12 caused by aging;

a non-symmetrical aging of the bonding connection $V_{outpos}$ and $V_{outneg}$;

offset drifts or offset displacements within the signal processing unit 20 of the sensor module in the integrated circuit 10, meaning a restriction of the modulation range and a short circuit at the sensor output $A_s$.

In this illustration, the offset monitoring device is a component of a control circuit 17. The control circuit is the high-pass filter for the sensor module. This circuit controls the output signal $A_s$ of the sensor module to $V_{DD}/2$. For offset regulations with a high-pass filter, only short-term acceleration signals are retransmitted without distortion. The system is too sluggish to control the short-term measuring signals, which originate with the sensor element. The regulation to $V_{DD}/2$ only occurs for a time-constant signal, as is the case for the offset. In this case, time constancy does not mean that the signal must actually remain constant during the complete operating period, but only for a long period of time, relative to the short-term measuring signal. The offset can also change gradually during the operation. In that case, it is still filtered out during the high-pass filtering. The high-pass filter consists of a differential amplifier circuit 18, which in turn comprises the operational amplifiers 19, 20, as well as an amplifier 27, the signal processing unit 20 of the sensor module, a clocking generator 26, an A/D converter 22, a digital adder 23 and a D/A converter 21. If an offset displacement $V_{off}$ exists for this circuit at point in time t=0 and if the offset values are outside of the specified range, a torn bonding wire, for example, may be the cause. As a result, the voltage at output $A_s$ will deviate from $V_{DD}/2$. The A/D converter 22 is designed such that in the steady state, meaning if $V_{DD}/2$ is present at the sensor output $A_s$, it has the output value ZERO. If the signal deviates at the sensor output As from $V_{DD}/2$, it assumes values that are higher or lower than ZERO, depending on whether the output voltage is higher or lower than $V_{DD}/2$. With each clock pulse generated by the clock generator, the adder 23 adds the digital output signal of the A/D converter 22, which has been weighted with a constant C. The constant C of digital adder 23 must be selected such that the control circuit operates with negative follow-up. It means that a signal is always fed in at point P, which has a magnitude designed to counteract the deviation from $V_{DD}/2$ at the output $A_s$. The lower limit frequency for the high-pass filter is adjusted simultaneously with the constant C. As a result of this, the speed for reaching the upper (as a rule positive) or the lower (as a rule negative) limit value in case of an error is determined. The D/A converter 21 at the output of the digital adder 23 converts the digital numerical value to an analog voltage and moves the potential of operational amplifier 25 at point P until the output signal $A_s$ of the sensor equals $V_{DD}/2$. The digital adder 23 can display as a minimum the number 0, which corresponds to the smallest (as a rule negative) value and as a maximum the number $2^N-1$ (n-bit adder), which corresponds to the highest and as a rule positive value. The value 0 for this digital adder is between the number 0 and the number $2^N-1$. In the event that the standard deviation (offset displacement) is outside of the specified range, the adder adds the output signals at the A/D converter 22 until it reaches its minimum (negative) or maximum (positive) number value. The extreme values 0 and $2^N-1$ are recognized by the monitoring unit 24 and the error status output $A_F$ is set equal to error status ZERO.

In the exemplary embodiment shown, the components are used by the offset regulation device as well as the offset monitoring device. The adding up of the deviation from $V_{DD}/2$ occurs during the adjustment operation. If the adjustment to $V_{DD}/2$ takes too long because the deviation is too large, the system recognizes and indicates the excessively large, impermissible deviation.

The digital adder with the clock generator, A/D converter, and D/A converter can also be replaced by an analog adder.

The differential amplifier can also be realized with different types of circuits.

What is claimed is:

1. An offset regulation device for a sensor module, in particular for acceleration sensors and pressure sensors, comprising an offset regulation device that continuously detects an actual value, compares this value to a desired value and, in case of a deviation, adjusts the actual value to the desired value; and a monitoring device for detecting an excessively high offset integrated in the regulation device, wherein this monitoring device comprises an analog or digital, clocked adder that is connected to monitor the actual value and adds up the deviation between the actual value and the desired value, which deviation is weighted with an optional factor, and a monitoring circuit that is connected to the adder and generates an error message once a maximum or minimum limit value is reached.

2. A method for an offset regulation according to claim 1, wherein the fed in value to the adder is weighted in the adder with a predetermined constant (C), which adjusts the speed for reaching the limit value during the adding up of the values.

3. An offset regulation device for a sensor module according to claim 1, wherein the offset regulation device is a high-pass filter.

4. An offset regulation device for a sensor module according to claim 1, wherein the adder is a clocked digital adder having an input connected to an output of an analog to digital converter having an input connected to receive the actual value, a first output connected to said monitoring circuit, and a second output connected to an input of a digital to an analog converter having an output connected to said regulating circuit to provide a feedback signal corresponding to the deviation to an input of the offset regulation circuit for use in the comparison.

5. A method for offset regulation of an output signal for a sensor module, in particular for acceleration sensors and pressure sensors, comprising: detecting an actual value produced by the sensor; comparing this detected value to a desired value; in case of a deviation, adjusting the actual value to the desired value; monitoring the adjusted actual value to detect an excessively high offset by adding up the deviation, weighted by an optional factor, between the actual value and the desired value using an analog or digital, clocked adder, and generating an error message once a maximum or minimum limit value is reached.

* * * * *